2 Sheets—Sheet 1.

F. IMHORST.
Construction of Freighting-Vessels.
No. 224,691. Patented Feb. 17, 1880.

Witnesses:
Henry Schling
Frank Leman Wing

Inventor:
Ferdinand Imhorst

F. IMHORST.
Construction of Freighting-Vessels.
No. 224,691. Patented Feb. 17, 1880.
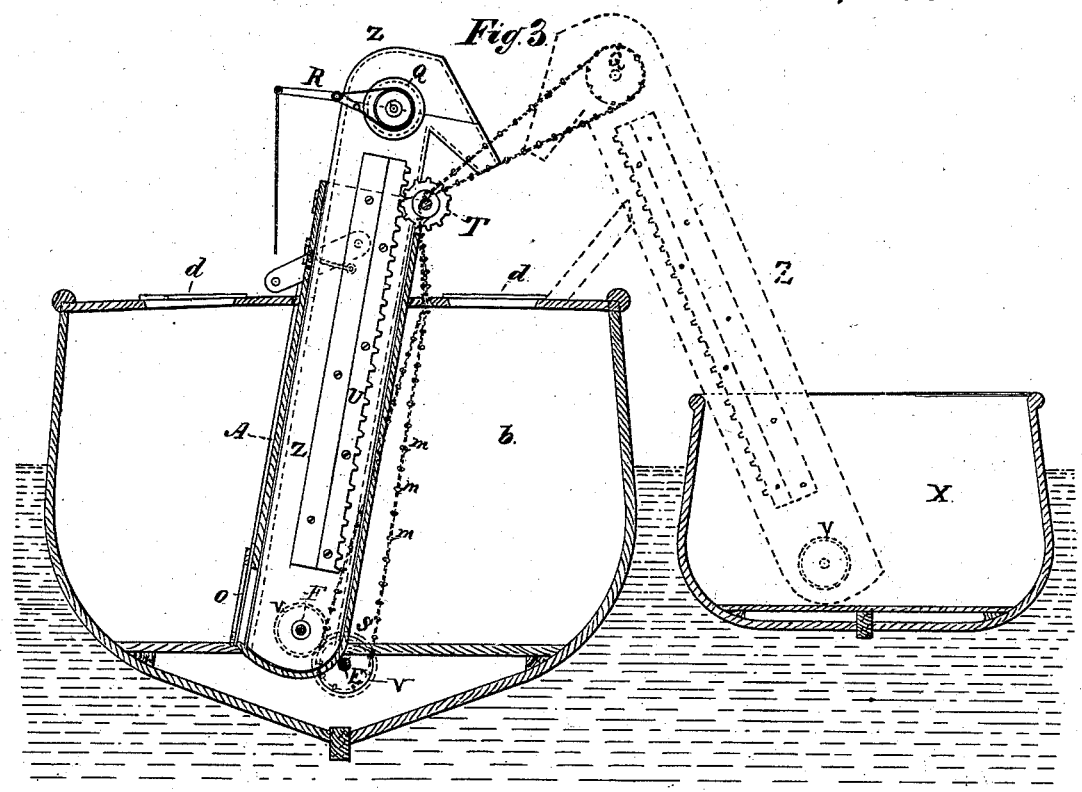
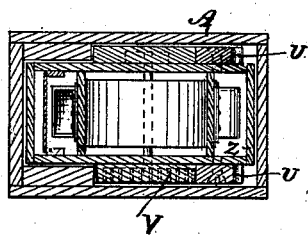
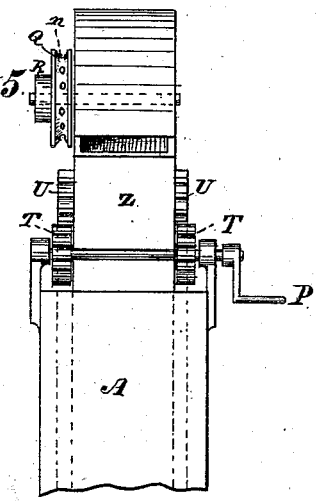
Witnesses:
Henry Eichlings
Frank Lenman Wing
Inventor:
Ferdinand Imhorst

UNITED STATES PATENT OFFICE.

FERDINAND IMHORST, OF BALTIMORE, MARYLAND.

CONSTRUCTION OF FREIGHTING-VESSELS.

SPECIFICATION forming part of Letters Patent No. 224,691, dated February 17, 1880.

Application filed October 14, 1879.

*To all whom it may concern:*

Be it known that I, FERDINAND IMHORST, of the city of Baltimore, county of Baltimore, and State of Maryland, have invented new and useful Improvements in the Construction of Freighting-Vessels, of which the following is a specification.

The nature of my improvements, taken in connection with the drawings, will enable any one skilled in the art to comprehend and construct such improvements in machinery in freighting-vessels.

My invention relates to a flexible cover and the necessary fastenings of chains and pulleys, for the purpose of holding the cargo in its place and preventing the shifting of the cargo.

Figure 1:
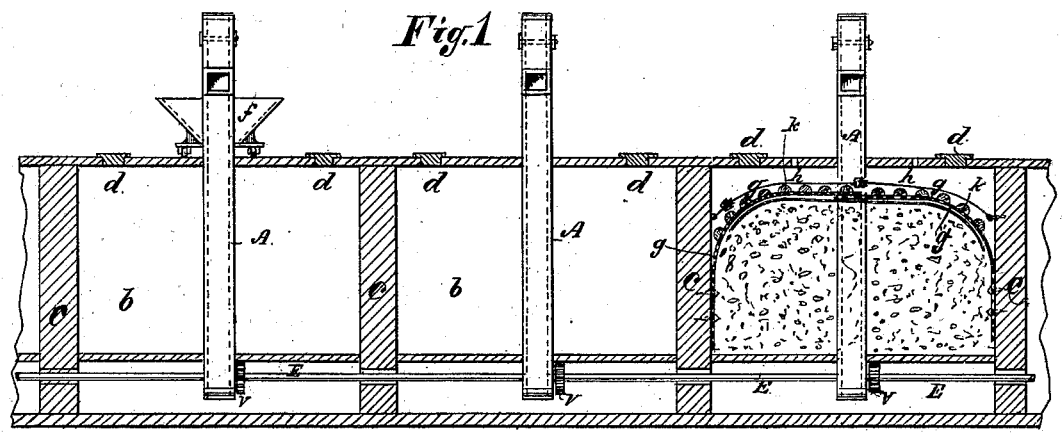
Figure 2:
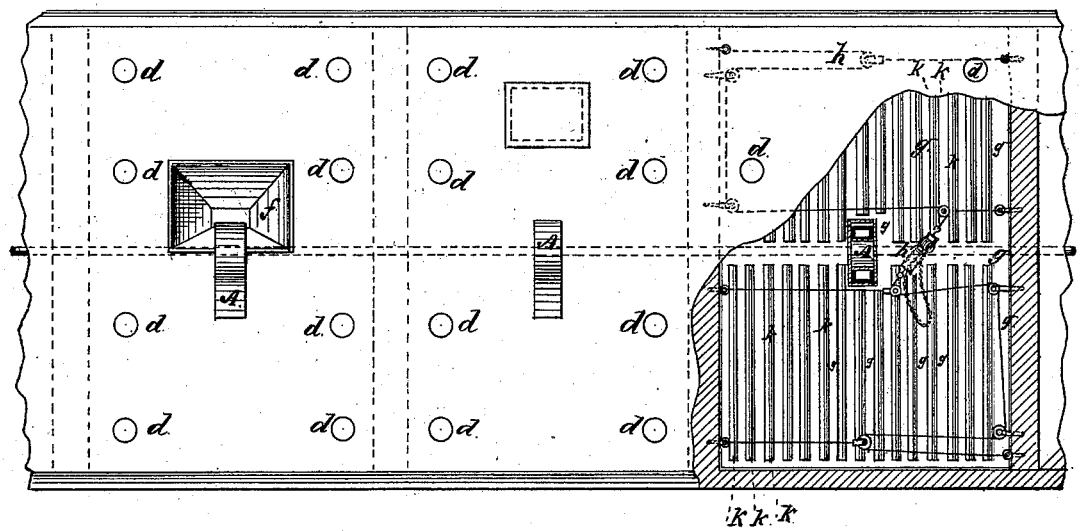

Figure 1 shows a vertical longitudinal section of the compartments of a vessel with stationary elevators, also shaftings and cogged wheels or pulleys for working elevators proper, also the flexible cover with ribs, ropes or chains, and pulley-blocks arranged for holding the cargo. Fig. 2 shows a horizontal section and plan of the same. Fig. 3 shows a vertical cross-section of stationary elevator as built within a vessel, showing the cogged wheels as arranged for transmiting motion from the main driving-shaft to the elevators proper. Fig. 4 shows a plan view of the elevator. Fig. 5 shows a vertical section of the elevator.

In Figs. 1, 2, 3, A shows permanent elevators as built within a vessel or compartment, *b*. The main shaft E, with cogged wheels V, is constructed to operate upon corresponding cog-wheel F, which is fastened to the shafting of the elevator A, as shown in Fig. 3, and operating upon the belt and buckets of the elevator proper whenever the shaft E is set in motion by the machinery of the vessel. In this manner a cargo of grain, ore, coal, or other merchandise can be moved from the vessel in a very short time.

Figs. 1 and 2 show my attachment for holding the cargo securely after the vessel is loaded. It consists of a flexible covering, *g*, made of canvas or other durable material. Fastened to this covering at short distances are firmly secured ribs K K, of solid material, as wood or the like. This covering is securely fastened by a series of bolts and rings to the sides of the vessel, so that each section may be lapped over its neighbor after the cargo is in. This covering is then drawn down firmly over the cargo by means of a series of ropes and pulleys, *h h*, so rigged that they may be easily fastened as the cargo settles.

What I claim as new, and desire to have secured to me, is—

The flexible cargo-cover *g*, having the distributed ribs K K, in combination with an apparatus, *h*, consisting of a series of ropes or chains and pulley-blocks, arranged for drawing the cover tightly over the cargo, substantially as described.

FERDINAND IMHORST.

Witnesses:
JEFF. SCHULTZ, Jr.,
HENRY F. STAYLOR.